United States Patent [19]

Choudhury

[11] Patent Number: 5,518,741
[45] Date of Patent: May 21, 1996

[54] PRODUCT AND PROCESS FOR THE UTILIZATION OF ENZYME AND MUSCLE FROM FISH CONTAINING PROTEOLYTIC ENZYMES

[75] Inventor: Gour S. Choudhury, Kodiak, Ak.

[73] Assignee: University of Alaska, Fairbanks, Ak.

[21] Appl. No.: 361,813

[22] Filed: Dec. 22, 1994

[51] Int. Cl.$^6$ .............................. A23B 4/20; A23L 1/325
[52] U.S. Cl. ........................... 426/63; 426/641; 426/643; 426/646; 426/655; 426/656
[58] Field of Search .............................. 426/63, 641, 643, 426/646, 655, 656

[56] References Cited

U.S. PATENT DOCUMENTS

| | | | |
|---|---|---|---|
| 3,000,789 | 9/1961 | Bertullo et al. | |
| 3,170,794 | 2/1965 | Jeffreys et al. | |
| 3,516,349 | 6/1970 | Bertullo et al. | |
| 4,207,354 | 6/1980 | Haga et al. | 426/643 |
| 4,816,278 | 3/1989 | Sasamoto et al. | |
| 4,853,231 | 8/1989 | Osajima et al. | 426/63 |
| 4,861,602 | 8/1989 | Uchida et al. | 426/643 |
| 4,935,192 | 6/1990 | Porter et al. | 426/643 |
| 4,986,999 | 1/1991 | Takasaki et al. | 426/643 |

OTHER PUBLICATIONS

Wang et al. 1955, "Enzymatic Tenderization of Meat", Food Research, Nov., Dec. pp. 587, 597.
Kitagawa, "Extrusion Cooking Using Marine Products as Raw Materials," Journal of Fish Sausage, No. 221, 1989.
Kitagawa et al., "Extrusion Cooking Using Marine Products as Raw Materials, Report 1 Extrusion Cooking Using Sardines," Hokuzuishi Monthly, vol. 44, pp. 151–168, 1987 (Report No. B1935).
Kitagawa et al., "Studies on the Extrusion Cooking of Marine Products, III. Effect of Various Extrusion Conditions on Freeze–Pulverized–BUNASAKE (Fall Chum Salmon)," Sci. Rep. Hokkaido Fish. Exp. Stn., vol. 32, pp. 19–32 (1989).

Murray et al., "Improved Utilization of Fish Protein—Co–extrusion of Mechanically Deboned Salted Minced Fish," Can. Inst. Food Sci. Technol. J., vol. 13, No. 3, pp. 125–130, Jul. 1980.
Yu et al., "Production and Acceptability of Testing Fish Crackers ('Keropok') Prepared by the Extrusion Method," J. Fd. Technol. vol. 16, pp. 51–58 (1981).
Kristensen et al., "Extruded Protein–Rich Animal By–Products with Improved Texture," Thermal Processing and Quality of Food, Elsevier Pub. 1984.
Hilmarsdottir et al., "Microbial Stability of a Fermented Intermediate Moisture Fish Product," New Jersey Agricultural Experiment Station Publication No. D–10104–1–84 (1984).
Maga et al., "Coextrusion of Carp (*Cyprinus carpio*) and Rice Flour," Journal of Food Processing and Preservation, vol. 9, pp. 121–128 (1985).
Venugopal, "Feasibility of Incorporation of Partially Deodourised Fish Meat in Exrusion Cooked Products," Journal of Food Science and Technology, vol. 24, pp. 147–148, May/Jun. 1987.
Karmas et al., "Novel Products from Underutilized Fish Using Combined Processing Technology," Journal of Food Science, vol. 52, No. 1, pp. 7–9, 1987.

(List continued on next page.)

*Primary Examiner*—Helen Pratt
*Attorney, Agent, or Firm*—Finnegan, Henderson, Farabow, Garrett & Dunner

[57] ABSTRACT

A method for proteolytic degradation of fish muscle having protease enzyme which includes distributing the enzyme uniformly throughout the fish muscle and drying the fish muscle thereafter. The present invention also relates to a method of making a food product and includes reducing hydrolyzed fish muscle to a powdered form, and then mixing the fish muscle in powder form with a starchy and/or proteinaceous material to form a mixture which is subsequently subjected to high temperature extrusion processing to form a desired food product.

21 Claims, 5 Drawing Sheets

OTHER PUBLICATIONS

Noguchi, "Extrusion Cooking of High–Moisture Protein Foods," Extrusion Cooking, AACC, 1989, Chapter 11.

Quaglia et al., "Use of Sardine Mince in Ceral Blends to Obtain Extruded Products," Ital. J. Food Sci. No. 4, pp. 23–28, 1989.

Aoki et al., "Texturization of Surimi Using a Twin Screw Extruder," Nippon Shokuhin Kogyo Gakkaishi, vol. 36, No. 9, pp. 748–753 (1989).

Nicklason et al., "Simultaneous Heating, Forming and Extruding of Surimi–Based Products," Journal of Food Engineering, vol. 9, pp. 219–229, 1989.

Kitabatake et al., "Continuous Production of Fish Meat Sol Using a Twin–Screw Extruder," Journal of Food Science, vol. 53, No. 2, pp. 344–348, 1988.

Bhattacharya et al., "Effect of Extrusion Process Variables on Micro–structure of Blends of Minced Fish and Wheat Flour," J. Fd. Sci. Technol., vol. 27, No. 1, pp. 22–28, 1990.

Clayton et al., "Extruder Texturized Foods from Underutilized Fish Tissue," Journal of Acquatic Food Product Technology, vol. 1, pp. 65–89, 1992.

Williams et al., "Extrusion, Extrusion—An in–depth look at a versatile process," Food Engineering International, vol. 2, No. 4, pp. 57–161, 1977.

Van de Velde et al., "Destruction of Microorganisms and Toxins by Extrusion–Cooking," Thermal Processing and Quality of Food (P. Leuthen et al., Eds.) Elsevier Applied Science Publishers, London, pp. 155–161, 1984.

M. A. Rao, "Aseptic Processing of Foods," Design and Production of Food Ingredients, pp. 247–249.

Mustakas et al., "Production and Nutritional Evaluation of Extrusion–Full–Fat Soybean Flour," Journal of the American Oil Chemists' Society, pp. 607–614, Sep., 1964.

Mustakas et al., "Extruder–Processing to Improve Nutritional Quality, Flavor, and Keeping Quality of Full–Fat Soy Flour," Food Technology, vol. 24, pp. 102–108, Nov. 1970.

Lorenz et al., "Nutrient Stability of Full–Fat Soy Flour and Corn–Soy Blends Produced by Low–Cost Extrusion," Cereal Foods World, vol. 25, No. 4, pp. 161–172, Apr. 1980.

Linko et al., "High–Temperature, Short–time Extrusion Cooking," Advances in Cereal Science and Technology, vol. IV, Pomeranz, Ed., Ameican Association of Ceral Chemists Inc., Publ., St. Paul, Minnesota, 1981.

Lewis, "Physical Properties of Foods and Food Processing Systems," Ellis Horwood Series in Food Science and Technology, Section 10.5, Thermal Processing.

Jansen et al., "Nutritional Evaluation of Blended Foods made with a Low–Cost Extruder Cooker," Journal of Food Science, vol. 43, pp. 912–915, 1978.

Harper, "Extrusion of Foods, vol. I," CRC Press, Inc., Boca Raton, Florida, p. 2.

Geankoplis, "Transport Processes and Unit Operations," Allyn and Bacon, Inc., Publ., Section 4.8, pp. 249–256.

Lund, "Heat Processing," Principles of Food Science, Part II, Marcel Dekker, Inc., New York, 1976.

Nierle et al., "Veranderungen der Geitreideinhaltsstoffe wahrend der Extrusion mit einem Doppelschneckenextruder," with English translation of Conclusion Section.

Niki, H., et al., "Peruvian Hake Meat Having a Lack of Kamoboko–Forming Property", Bulletin of the Japanese Society of Scientific Fisheries, vol. 50(11), 1984, pp. 1917–1924.

Niki, H., et al., "Properties of Peruvian Hake Meat and Preparation of Purified Surimi", Bulletin of the Japanese Society of Scientific Fisheries, vol. 50(12), 1984, pp. 2043–2047.

Patashnik, M., et al., "Pacific Whiting, *Merluccius productus:* I. Abnormal Muscle Texture Caused by Myxosporidian–Induced Proteolysis", Marine Fisheries Review, vol. 44(5), May 1982, pp. 1–12.

Erickson, M. C., et al., "Proteolytic Activity in the Sarcoplasmic Fluids of Parasitized Pacific Whiting (*Merluccius products*) and Unparasitized True Cod (*Gadus macrocephalus*)", Journal of Food Science, vol. 48, 1983, pp. 1315–1319.

Konagaya, Shiro, "Jellification and Protease Activity of Yellowfin Sole Muscle in Association with a Myxosporidian Parasite", Bulletin of the Japanese Society of Scientific Fisheries, vol. 46(8), 1980, pp. 1019–1926.

Kudo, G., et al., "Factors Affecting Cooked Texture Quality of Pacific Whiting, *Merluccius productus*, Fillets with Particular Emphasis on the Effects of Infection by the Myxosporeans *Kudoa paniformis* and *K. thyrsitis*", Fishery Bulletin, vol. 85, No. 4, 1987, pp. 745–756.

Pedersen, L. D., et al., "Hyperfiltration Technology for the Recovery and Utilization of Protein Materials in Surimi Process Wash Water", National Food Processors Association, Dublin, California, NA 86AA–H–SK140, Jan. 1989, for National Marine Fisheries Services, U.S. Dept. of Commerce NOAA.

Martelli, F. G., Ph.D., "Twin–Screw Extruders: A Basic Understanding," Van Nostrand Reinhold Company, pp. 10–11, 24–25, 38–39, 46–47, 64 and 65.

Schwartzberg, H. G., "Biotechnology and Food Process Engineering", Institute of Food Technologists, Basic Symposium Series, pp. 297–307.

Banks, A., et al., "Freezing Fish", Fundamentals of Food Freezing, Avi Publishing Company, Inc., p. 273.

Regenstein, J. M., et al., "Introduction to Fish Technology", an Osprey Book, Van Nostrand Reinhold, pp. 126–131.

Aitken, A., et al., "Fish. Handling & Processing, Second Edition", for the Ministry of Agriculture, Fisheries & Food, Torry Research Station, Edinburgh, pp. 98–114.

"Is Alaska Flatfish Fool's Gold?", Seafood Leader, Nov./Dec. 1989, pp. 156–158.

Tettweiler, Peter, "Snack Foods Worldwide", Food Technology, vol. 45(2), Feb. 1991, pp. 58–62.

"Snack Food Month and New Snacks", Food Technology, Feb. 1991, p. 64.

Lee, C. M. and Toledo, R. T., "Factors Affecting Textural Characteristics of Cooked Comminuted Fish Muscle", Journal of Food Science, vol. 41 (1976), pp. 391–397.

Schwimmer, S., "Influence of Water Activity on Enzyme Reactivity and Stability", Food Technology, May 1980, pp. 65–70; 73–74; 82–83.

Troller, J. A., "Influence of Water Acivity on Microorganisms in Foods", Food Technology, May 1980, Institute of Food Technologies, pp. 76–82.

Rockland, L. B. and Nishi, S., "Influence of Water Activity on Food Product Quality and Stability", Food Technology, Apr. 1980, Institute of Food Technologies, pp. 42–51.

Greene, D. H. and Babbitt, J. K., "A Research Note: Control of Muscle Softening and Protease–Parasite Interactions in Arrowtooth Flounder *Atheresthes stomias*", Journal of Food Science, vol. 55, No. 2, 1990 pp. 579–580.

Wasson, D. H., et al., "Effects of Additivies on Proteolytic and Functional Properties of Arrowtooth Flounder Surimi", Journal of Aquatic Food Product Technology, vol. 1(3/4), 1992, pp. 147–165.

Wasson, D. H., et al., "Characterization of a Heat Stable Protease from Arrowtooth Flounder; *Atheresthes stomias*", Journal of Aquatic Food Product Technology, vol. 1(3/4), 1992, pp. 167–183.

PRODUCT AND PROCESS FOR THE UTILIZATION OF ENZYME AND MUSCLE FROM FISH CONTAINING PROTEOLYTIC ENZYMES

This invention was made with government support under Agreement No. NA46RG0104 (OA321:RAW/PJH) of the National Oceanic and Atmospheric Administration. The government has certain rights in the invention.

BACKGROUND OF THE INVENTION

The present invention relates to a method for proteolytic degradation of fish that uses proteolytic enzyme(s) present in fish muscle to bring about heat-induced myofibrillar degradation, and to produce food products from the autolyzed or hydrolyzed mince.

Declining stocks of fish species has prompted the seafood industry to look for underutilized or untapped fishery resources. Some of the underutilized or untapped commercial fish species that are potential resources are arrowtooth flounder (*Atheresthes stomias*), yellow fin sole (*Limanda aspera*), Pacific whiting (*Merluccius productus*), Peruvian Hake (*Merluccius gayi peruanus*) and menhaden (*Brevoorti tyrannus*). These fish species have unacceptable textural attributes due to high levels of proteolytic activity.

Arrowtooth flounder (*Atheresthes stomias*) is one of Alaska's largest seafood resources. According to a recent estimate of the North-Pacific Fisheries Management Council, the Bering Sea and Gulf of Alaska total allowable biological catch (ABC) for 1992 was 386,180 metric tons (Monsen, M. J. Jr., Alaska Fisheries Development Foundation, Inc. Personal Communication, 1992). The vast arrowtooth resource is presently unmarketable. Presence of proteolytic enzyme (protease) in arrowtooth flounder muscle has frustrated efforts to develop a market for this fish. Protease brings about degradation of myosin during normal cooking that leads to excessive softening of the muscle tissue and results in an unacceptable paste-like texture of the cooked product. Similar enzyme mediated muscle softening has been encountered in Peruvian hake (Niki et al., Bull. Jpn. Soc. Sci. Fish. Vol. 50, No. 11, p. 1917, and Vol. 50, No. 12, p. 2043, 1984), Pacific Whiting (Patashnik et al., Mar. Fish. Rev., Vol. 44, page 1, 1982; Erikson et al., J. Food Sci., Vol. 48, p. 1315, 1983; Kudo et al., Fish Bull. Vol. 85, No. 4, p. 745, 1987), and Yellowfin sole (Konagaya, Bull. Jpn. Soc. Sci. Fish., Vol. 46, No. 8, p. 1019, 1980). The untapped arrowtooth flounder is not utilized due to the present non-availability of technology to manipulate the muscle protease. The stocks are virgin and practically untouched (Anon., Seafood Leader, Vol. 9, No. 5, p. 156, 1989).

Some attempts have been made to produce injected fillet and surimi using protease inhibitory additives. Distribution and diffusion of an inhibitor to enzyme sites present a problem with injection technology. Attempts have been made to produce surimi using sulphydryl blocking agents (Wasson et al., J. Aq. Food Prod. Technol., Vol. 1, No. 3/4, p. 147 and p. 169, 1992). The inhibitor to be used should be a food grade additive certified by regulatory agencies. Surimi technology using chemical additives, if and when available, will utilize less than 20% of the harvested resource (Pedersen et al., Hyperfiltration Technology for the Recovery and Utilization of Protein Materials in Surimi Process Wash Waters, Final Report of Project #NA 8611-H-SK140, Prepared for National Marine Fisheries, Department of Commerce, U.S.A., 1989; Lee, Food Technol., Vol. 40, No. 3, p. 115, 1986). Remainder of the harvest (more than 80%) will be discarded as processing waste. Furthermore, consumers tend to dislike food products manufactured with additives. With a declining market price for surimi, the economic feasibility for commercial production of arrowtooth surimi is doubtful. At the present market value it is not even possible to recover the manufacturing cost.

Utilization of arrowtooth flounder may lead to development of a new fishery with marketing potential of about 386,180 metric tons a year. According to some fisherman of Kodiak, abundance of arrowtooth flounder may be preventing the resurgence of shrimp fisheries in the Gulf of Alaska. Utilization of arrowtooth flounder may help revive shrimp and other crustacean species.

Development of a new technology for utilization of arrowtooth flounder will lead to development of a new fishery. The process of the present invention will utilize a vast supply of valuable proteins and produce consumable products.

SUMMARY OF THE INVENTION

Accordingly, it is an object of the present invention to provide a process that will advantageously use proteolytic enzyme(s) present in fish muscle to bring about heat-induced myofibrillar degradation, and to produce food products from the autolyzed or hydrolyzed muscle.

It is also an object of the present invention to utilize the protease enzyme found in some fish muscle to advantageously hydrolyze muscle from any fish, from any animals such as cattle, pigs, chicken, and turkeys, and muscle recovered from animal by-products. The enzyme can be used in any application where proteolytic degradation is necessary or desired.

An additional goal is to develop a process by a suitable combination of proteolysis, drying and extrusion which will provide a commercially viable means for utilizing protease enzyme containing fish, such as arrowtooth flounder and other marine resources, including muscle from any fish, muscle from other animals (such as cattle, pigs, chicken, turkeys, and the like) and muscles recovered from animal by-products.

Additional objects and advantages of the present invention will be set forth in part in the description which follows, and in part will be obvious from the description, or may be learned by practice of the present invention. The objects and advantages of the invention will be realized and attained by means of the elements and combinations particularly pointed out in the appended claims.

The above objectives are accomplished by the present invention which, in part, relates to a method to utilize protease enzyme present in fish muscle and includes distributing the enzyme throughout the entire fish or other animal muscle. Afterwards, the muscle is autolyzed and dried simultaneously or in sequence.

Thereafter, in a method to make a food product from the fish or other animal muscle, the autolyzed dried muscle is reduced to a powdered form. Then, a starchy and/or proteinaceous material is mixed with the powder to form a mixture which is subjected to high temperature processing such as elevated temperature extrusion processing to form a product which can be shaped in any form and subjected to further processing such as drying, baking, and flavoring to form food products.

Alternately, the enzyme can be extracted from the muscle of fish containing protease enzyme and mixed with muscle from fish or any other animal (such as cattle, pigs, chicken, turkeys, and the like), or muscle by-products thereof. The mixture is subjected to proteolysis and drying simultaneously or in sequence.

The present invention further relates to the food products formed by the above methods.

It is to be understood that both the foregoing general description and the following detailed description are exemplary and explanatory only and are not restrictive of the present invention, as claimed.

The accompanying drawings, which are incorporated in and constitute a part of this specification, illustrate several embodiments of the present invention and together with the description, serve to explain the principles of the present invention.

BRIEF DESCRIPTION OF THE DRAWINGS

FIG. 3 is a flow-diagram of one embodiment of the process of the present invention for muscle from animals such as cattle, pigs, chicken, turkeys, and the like.

DETAILED DESCRIPTION OF THE PRESENT INVENTION

The protease enzyme containing fish muscle (also known as fish meat for purposes of the present invention) to be used in the process of the present invention includes that from fish having or containing protease enzyme. Specific examples of such fish are arrowtooth flounder, Pacific whiting, Yellowfin sole, Peruvian hake, menhaden, and the like.

The protease enzyme, for example, heat stable cysteine protease, present in arrowtooth muscle, causes rapid degradation of myosin heavy chain at elevated temperature. The arrowtooth protease with sulphydryl group(s) at the active sites exhibits maximum activity at 55° C. The enzyme is responsible for rapid proteolytic breakdown of myosin heavy chain and the degradation is complete within 20 minutes (Wasson et al., J. Aq. Food Prof. Technol., Vol. 1, No. 3/4, p. 147 and p. 169, 1992; Greene and Babbitt, J. Food Sci., Vol. 55, No. 2, p. 579, 1990). The process of the present invention uses the muscle bound enzyme (protease) advantageously to produce value-added food products from arrowtooth flounder and other fish having similar enzymes.

In particular, the process uses any combination of proteolysis, drying, and extrusion to fabricate value-added food products from arrowtooth flounder and other fish having similar proteolytic enzymes.

The protease enzyme containing fish to be used in the process of the present invention can be obtained by removing the inedible portions of the fish, which include the head, viscera, and backbone. One way of preparing the fish to be used in the present invention is as follows.

A protease enzyme containing fish, such an arrowtooth flounder, can be prepared for mincing by heading, gutting, and/or filleting the fish as those terms are understood by those skilled in the art. Such fish preparation is known in the art and, for instance, any fish filleting machine, such as BAADER 175 or 176, can accomplish the filleting. Hand filleting can also accomplish this preparation. Once this initial preparation is completed, the fish is minced to remove the fish muscle from the skin and bones of the fish. Again, such mincing operations are known to those skilled in the art, and any conventional mincer can be used in the process of the present invention, for example, a belt and drum mechanical mincer (BAADER 697). In the present invention, the fish meat is preferably minced.

The fish muscle obtained is stirred in a mixer to facilitate uniform distribution of the muscle protease throughout the fish. The speed setting of the mixer and the length of time in the mixer are dependent on the type of mixer, and the amount of fish being mixed. The mixer can be any conventional mixer as long as substantially uniform distribution of the enzyme throughout the meat is accomplished. For instance, in a RIBBON mixer, a preferred speed is from about 20 rpm to about 5 rpm, for about 10 minutes to about 40 minutes.

The mixed fish muscle is then subjected to proteolysis and drying. The proteolytic degradation of muscle proteins and drying of the fish muscle can be carried out simultaneously or in sequence.

Figure 5:
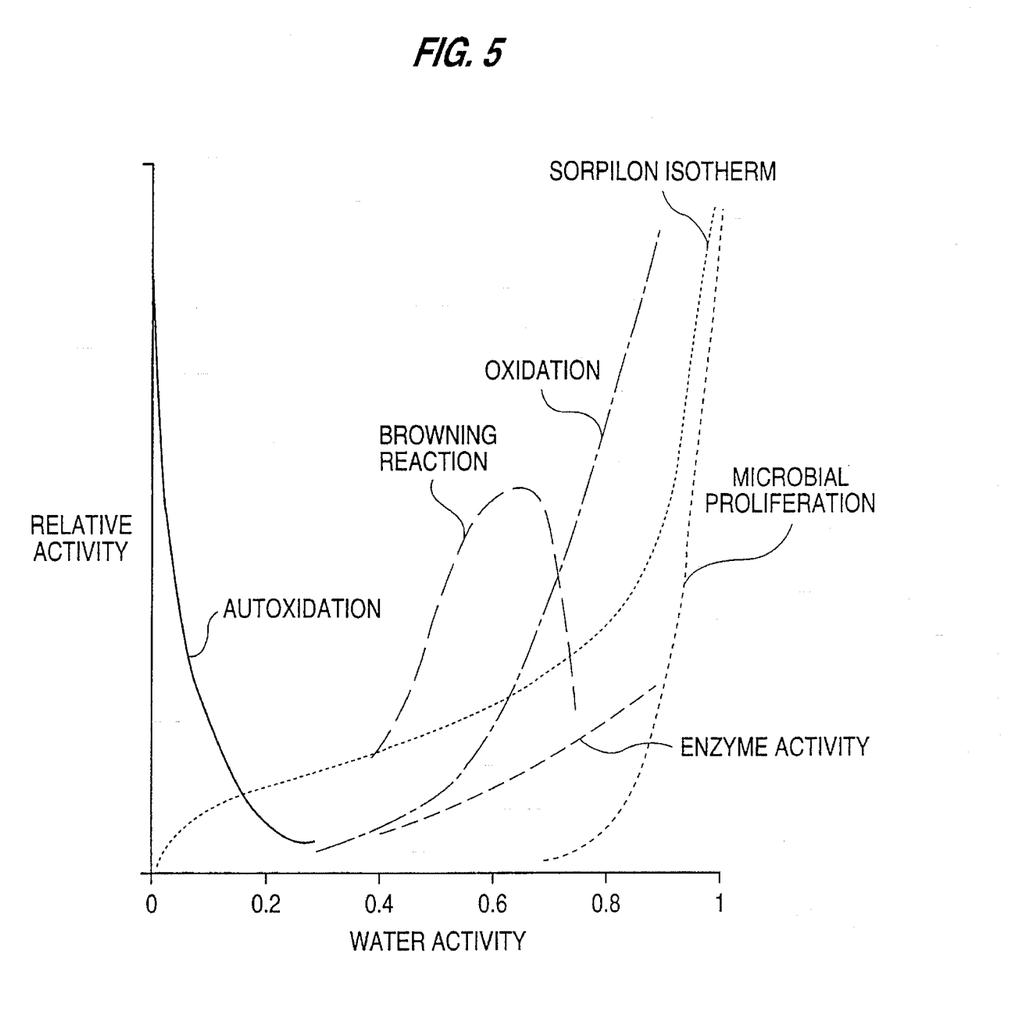
FIG. 5 is a graph showing the correlation between water activity and enzyme activity/microbial activity.

In the simultaneous process, the heat-induced myofibrillar degradation is completed during the initial phase of drying. As drying progresses, gradual loss of enzyme activity will occur. The removal of water during drying decreases water activity of the fish muscle. As shown in FIG. 5, the decrease in water activity is accompanied by gradual loss of enzyme activity and suppression of microbial activity (Schwimmer, Food Techol., Vol. 34, No. 5, p. 64, 1980; Troller, Food Technol., Vol. 34, No. 5, p. 76, 1980). Alternately, the muscle can be first hydrolyzed and then dried. The hydrolysis can be carried out in a reactor vessel connected to a food extruder or in the reactor vessel alone. The fish mince is brought to the optimum enzyme activation temperature in a food extruder and dropped in the reactor vessel, which is maintained at the optimum temperature for the enzyme action. The mince is then stirred in the reactor vessel until the desired degree of proteolysis is achieved.

Alternately, the mince can be added to a reactor vessel, brought to the optimum enzyme activation temperature and stirred at that temperature until the desired degree of proteolysis is achieved. The hydrolyzed muscle proteins can either be dried or fractionated before drying. The dried muscle or fractions thereof can then be used for the production of food products (FIGS. 1–4).

With regard to drying the fish muscle, any conventional dryer can be used as long as the dryer is capable of reducing the fish muscle moisture content to about 10%. The drying is carried out for from about 10 minutes to about 4 hours at a temperature of from about 55° C. to about 60° C. and then for about 7 hours at a temperature range of from about 70° C. to about 95° C. For example, it is preferable that the temperature of the arrowtooth flounder muscle be maintained at 55°–65° C. for the initial drying phase that can range from about 1 minute to about 4 hours, and preferably about 10 minutes to about 4 hours depending on the degree of proteolysis desired. The temperature during drying (second phase) will depend on the type of dryer used. A preferable temperature range for the second phase can be from about 70° C. to about 110° C. The drying time will depend on the type of dryer used. For example, 60 pounds of fish muscle can be dried (second phase drying) in a pilot scale tray dryer in about 7–8 hours. For fractions containing soluble proteins, a spray dryer can alternatively be used.

The dried autolyzed fish meat is then reduced to powder, mixed with starchy and/or proteinaceous ingredients, and subjected to extrusion processing.

Reducing the dried fish muscle into powder can be accomplished through conventional means known to those skilled in the art, including the use of Hammer Mill or Urschel Comitrol size reduction equipment. It is preferred that the dried fish meat be reduced to a size of about 10 to about 400 mesh, more preferably about 10 to about 100 mesh, and most preferably about 40 mesh.

Examples of starchy (or starch) ingredients or materials include, but are not limited to, rice flour, wheat flour, corn starch, corn meal, soy flour, and the like.

Examples of proteinaceous materials or ingredients include, but are not limited to, soy isolate, casein, whey protein, whey powder, wheat gluten, rice gluten, egg white powder, and the like. Although there is no intention to limit the amount of starchy and/or proteinaceous material to be added to the dried and powdered fish muscle, it is preferred that the resulting mixture have the ratio of about 5% to about 60% by weight fish muscle to about 40% to about 95% by weight starchy and/or proteinaceous material; more preferably about 5–30% fish muscle to about 70–95% starchy and/or proteinaceous material; most preferably about 5–20% fish muscle to about 80–95% starchy and/or proteinaceous material. The dried and powdered fish should be sufficiently mixed with the starchy and/or proteinaceous material and water so that a uniform mixture is obtained.

The uniform mixture is then introduced into an extruder, preferably a twin screw extruder. The high temperature extrusion is at a barrel temperature of from about 130° C. to about 190° C., preferably about 150° C. to about 165° C. It is also preferable that a reverse screw element and or kneading element be part of the screw configuration.

After extrusion processing, the mixture exits the extruder and enters a die opening/configuration which will form and shape the mixture. High temperature extrusion processing will destroy any residual enzyme activity and eliminate or reduce the microbial population.

The extrudate shaped by a suitable die will then be cut into pieces of desired length and subjected to post-extrusion processing such as drying, baking, flavoring, and packaging to produce value-added nutritive savory food products.

The protein mix obtained after proteolysis and the fractions obtained after proteolysis and fractionation can also be mixed with starchy and/or proteinaceous ingredients and extruded at a barrel temperature of about 200° C. to about 300° C. to form a texturized food product.

Figure 1:
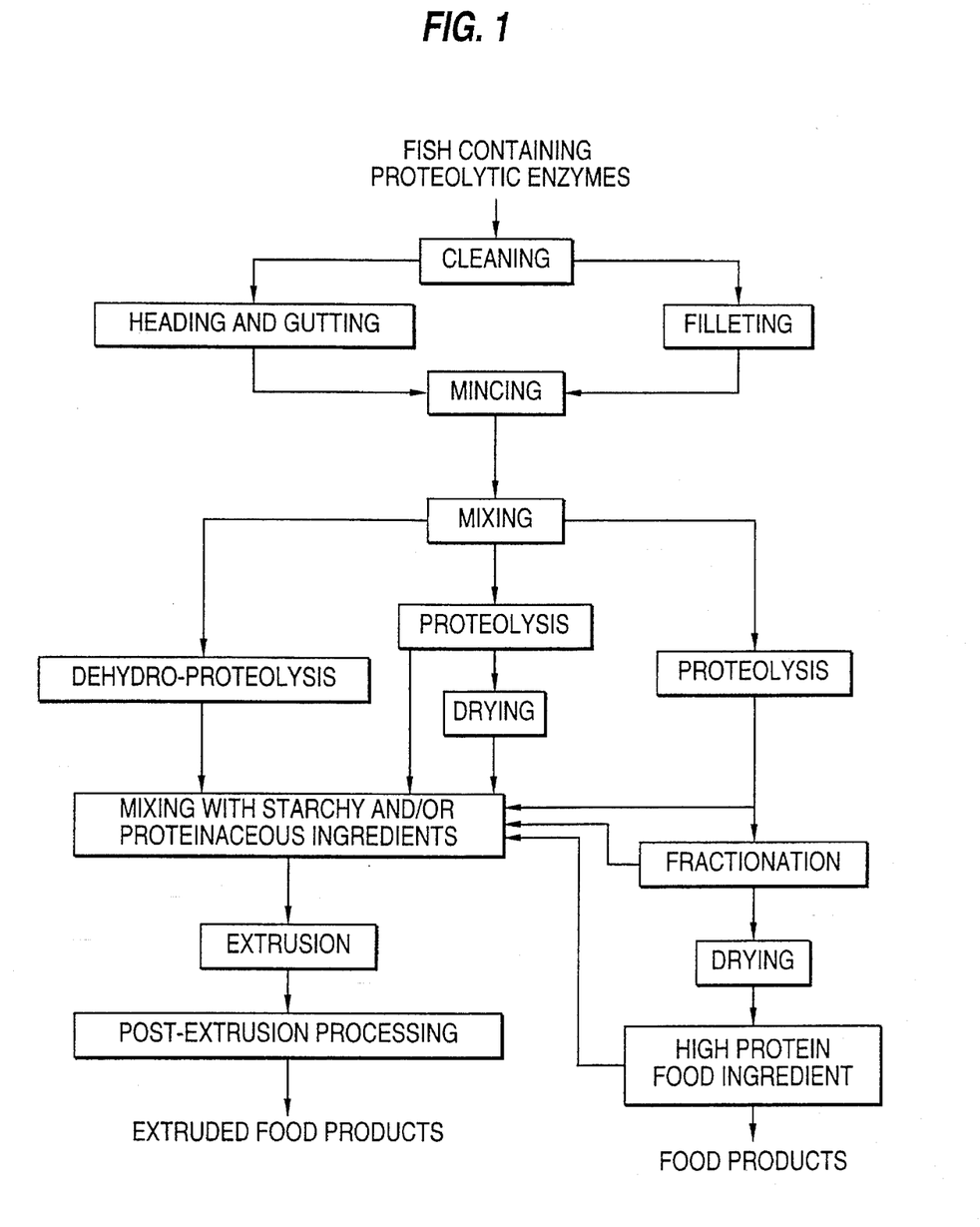
FIG. 1 is a flow-diagram of one embodiment of the process of the present invention for fish muscle containing protease enzyme.
Figure 2:
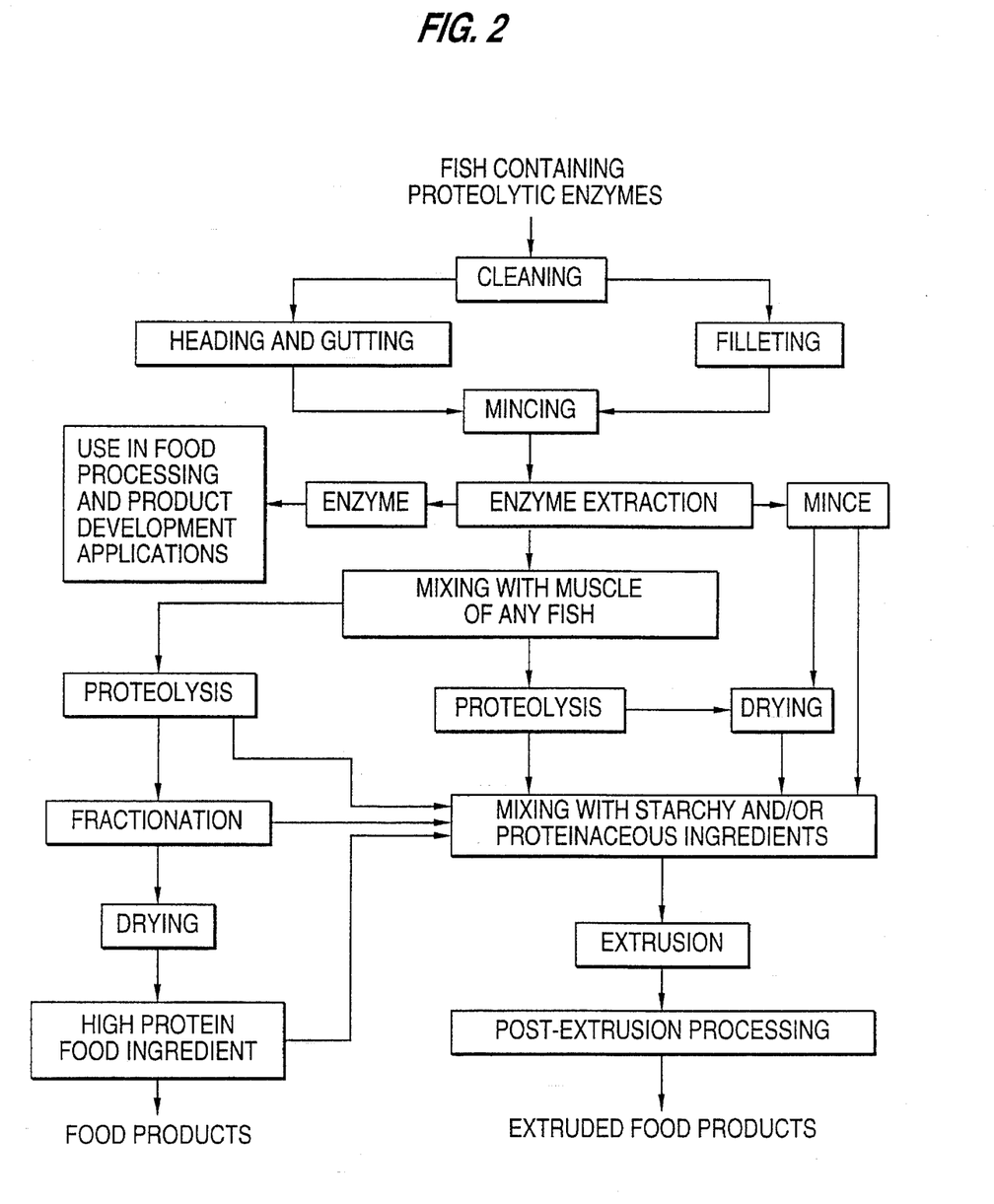
FIG. 2 is a flow-diagram of one embodiment of the process of the present invention for fish muscle with or without protease enzyme.
Figure 3:
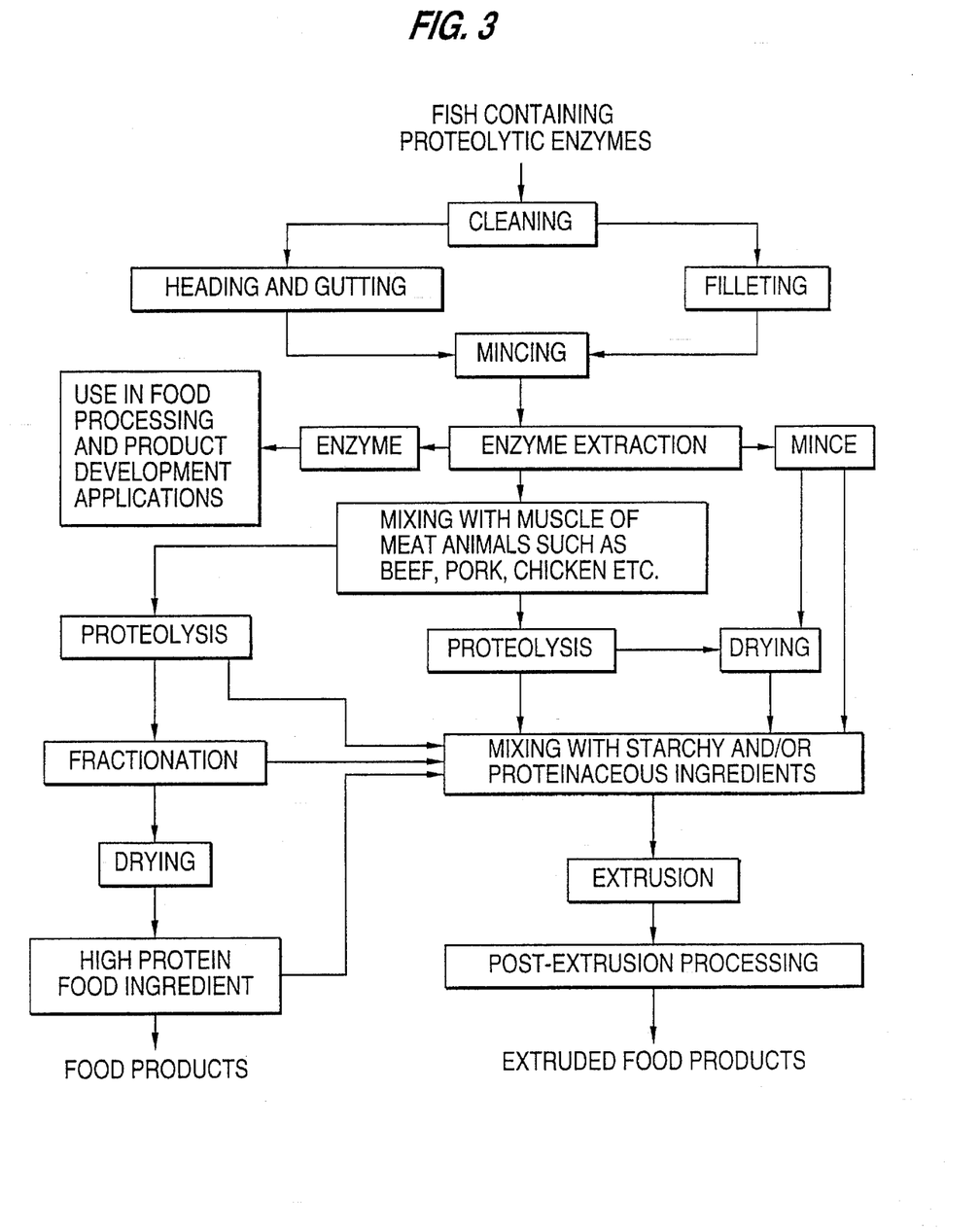
Figure 4:
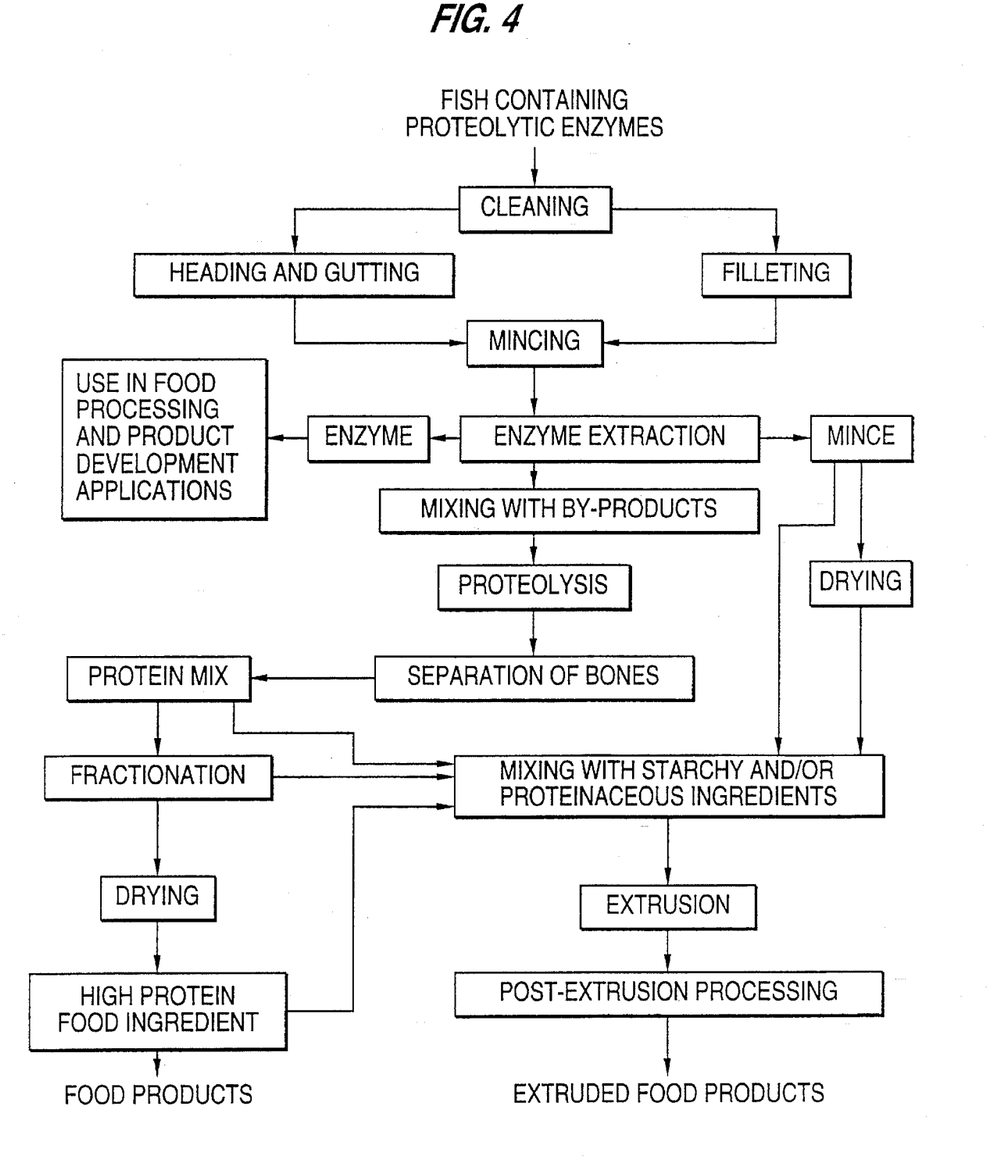
FIG. 4 is a flow-diagram of one embodiment of the process of the present invention for muscle recovered from fish and other animal by-products.

The flow-chart of one preferred process is shown in FIG. 1.

In another embodiment of the present invention, the use of proteolytic enzyme activity present in fish muscle can be used to hydrolize muscle from any other fish or animal, including by-products thereof.

In particular, enzyme containing fish muscle can be blended with water and tissuemized (i.e., the tissue is crushed into very small particles). Then the mixture can be centrifuged to form a crude enzyme extract. This extract can then be mixed with any fish or other animal muscle. By mixing this enzyme extract with fish or other animal muscle, the muscle can be partially broken down (i.e., tenderized) or substantially or completely broken down (i.e. about 10% to about 100% proteolytic degradation of the fish or other animal muscle). The substantial or complete degradation process can be enhanced if the fish or other animal muscle to be hydrolized is minced prior to being subjected to proteolysis.

Accordingly, the enzyme extract can be used to tenderize fish or other animal muscle. Alternatively, the enzyme extract can be used to cause entire high molecular protein polymer breakdown (proteolytic degradation) in fish or other animal muscle. Upon doing so, the fish or animal muscle can be dried and/or mixed with a starchy or proteinaceous material and extruded as described above to make food products.

The present invention will be further clarified by the following examples which are intended to be purely exemplary of the present invention.

EXAMPLE 1

Minced arrowtooth flounder was dried in an Enviro-Pack dryer/smoker at a wet bulb temperature of 55° C. and a relative humidity of 70%. The autolyzed dried mince was then ground in an Urschel Comitrol and sieved to obtain a 40 mesh powder. A mixture of hydrolyzed arrowtooth powder (15% fish solids) and rice flour (85% rice solids) was prepared at a moisture content of 10%. The mixture was extruded in a twin-screw extruder (Clextral BC 21) at 160° C. through a 5 mm diameter circular die. Screw configuration from feed to die end was: 50/50/2, 33.3/50/3, 25/50/3, 25/25/1, 16.6/50/1, LH16.6/25/1 (LH=Left Handed) and 16.6/50/2. These specifications are read as follows: pitch/length of screw element/number of screw elements. The total length of this combination of screw elements is 600 mm. The set barrel temperatures from feed to die end were 0°, 0°, 0°, 100°, 160°, 160° C., respectively. The actual barrel temperatures from feed to die end were 14°, 14°, 15°, 97°, 157°, 160° C., respectively. Feed rate and screw speed were at 12 kg/hr and 400 rpm respectively. The extruded product was very good in appearance (slightly brownish tinge) and had excellent expansion characteristics (expansion ration of 16.63).

EXAMPLE 2

Fish processing by-products (Pollock frame and skin) were treated with arrowtooth protease to recover muscle from the by-products. Arrowtooth mince and water were blended in a 2:3 ratio, tissuemized, and centrifuged at 12,000 g for 30 minutes. The crude enzyme extract (supernatant) was brought to its optimal proteolytic temperature of 55° C., added to an equal amount of by-products (Pollack frame and skin), also at 55° C., and agitated slowly for 1 hour. Controls were subjected to the same reaction conditions with water substituted for the crude enzyme extract. The progress of proteolytic reaction was followed by the BCA protein assay of the accruing soluble proteins. The soluble protein concentration over a period of one hour increased linearly by 13 µg/µl, 12.5 µg/µl and 25 µg/µl for Pollack mince, frame and skin respectively. These values were obtained after correcting for native soluble proteins, mechanical liberation of peptides by stirring and autoproteolysis. The frames were clean and free of adhering muscle tissue. The apparent breakdown of skin and intervertebral cartilaginous tissues indicate the affinity of the enzyme for these substrates. This affinity indicated that the enzyme has ability to tenderize and reduce toughness of meat.

EXAMPLE 3

The ability of arrowtooth protease to hydrolyze muscle of domestic meat animals was tested by incubating beef and pork with protease at optimal condition for enzyme action. Arrowtooth mince and water were blended in a 2:3 ratio, tissuemized in a Tekmer Tissuemizer (Type SDI-1810) for 6 minutes, and centrifuged at 10,000 g for 10 minutes in a refrigerated (4°-5° C.) centrifuge (Sorvall Dupont, Model RC5C). The crude enzyme extract (supernatant) was mixed with cubes of beef and pork in conical flasks and maintained at 55° C. in a water bath. Controls were subjected to same reaction conditions with water substituted for the crude enzyme extract. After 9 hours of incubation no breakdown was observed on the control flasks. The cubes in flasks containing the arrowtooth protease were broken down by approximately 50%. The broken cubes were removed and the enzyme solutions containing degraded proteins were centrifuged at 10,000 g for 20 minutes. The degraded proteins were collected at the bottom of each centrifuge tube. The reaction rate can be increased if the muscle from meat animals are minced and then subjected to proteolysis. The hydrolyzed proteins can be used to produce extruded products such as high protein expanded snack and such proteolytic enzymes can be used as a meat tenderizer.

The process of the present invention will utilize a vast supply of valuable proteins and produce a volume of consumable products.

The process of the present invention will also produce nutritive savory products that will compete in the snack food market and will provide access to diverse national and international markets.

Other embodiments of the present invention will be apparent to those skilled in the art from consideration of the specification and practice of the present invention disclosed herein. It is intended that the specification and examples be considered as exemplary only with the true scope and spirit of the invention being indicated by the following claims.

What is claimed is:

1. A method of making a food product from fish muscle from the group consisting of arrowtooth flounder, Peruvian hake, Pacific whiting, Yellowfin sole, and menhaden, containing protease enzyme comprising:
   distributing said enzyme substantially throughout said fish muscle;
   autolyzing said fish muscle at a temperature sufficient to permit protease degradation therein;
   during or after said autolyzing, drying said fish muscle at a temperature sufficient to reduce moisture content and form a dried autolyzed fish muscle;
   reducing said fish muscle to powder form;
   mixing said powder with a starchy and/or proteinaceous material to form a mixture;
   introducing said mixture into an extruder; and
   extruding said mixture in an elevated temperature extrusion process.

2. The method of claim 1, wherein said powder has a size of about 10 to about 100 mesh.

3. The method of claim 1, wherein said starchy material is selected from the group consisting of rice flour, wheat flour, corn starch, soy flour, and corn meal; and said proteinaceous material is selected from the group consisting of soy isolate, casein, whey protein, whey powder, wheat gluten, rice gluten, and egg white powder.

4. The method of claim 1, wherein said starchy and/or proteinaceous material is added in an amount of about 40% to about 95% by weight of the resulting mixture.

5. The method of claim 1, wherein said extrusion is conducted in a twin screw extruder.

6. The method of claim 5, wherein said extrusion is conducted at a temperature of from about 130° C. to about 190° C.

7. The method of claim 5, wherein said twin screw extruder contains a reverse screw element or kneading element.

8. The method of claim 1, further comprising forming said mixture after said extruding into a desired shape.

9. The method of claim 1, further comprising drying the mixture after said extruding.

10. The food product of claim 9, wherein said fish meat is selected from the group consisting of arrowtooth flounder, Peruvian hake, Yellowfin sole, Pacific whiting, and menhaden.

11. The food product of claim 10, wherein said fish is arrowtooth flounder.

12. The method of claim 1, further comprising adding a flavoring to said mixture after said extruding.

13. The food product resulting from the method of claim 1.

14. The method of claim 1, wherein said fish is arrowtooth flounder.

15. The method of claim 1, wherein the enzyme is distributed by reducing said fish into a finely divided form and by mixing said finely divided fish.

16. The method of claim 1, wherein drying is carried out at a temperature of about 55° C. to about 60° C.

17. The method of claim 1 wherein said drying reduces the moisture content of the fish muscle to about 10% by weight.

18. The method of claim 1 wherein said drying is carried out for from about 1 minute to about 8 hours.

19. The method of claim 1 wherein said drying is carried out for from about 10 minutes to about 4 hours at a temperature of from about 55° C. to about 60° C. and then for about 7 hours at a temperature range of from about 70° C. to about 95° C.

20. The method of claim 1, further comprising baking the mixture after said extrusion process.

21. The method of claim 1 further comprising hydrolyzing said fish muscle prior to or during the drying thereof.

* * * * *